United States Patent Office 3,402,704
Patented Sept. 24, 1968

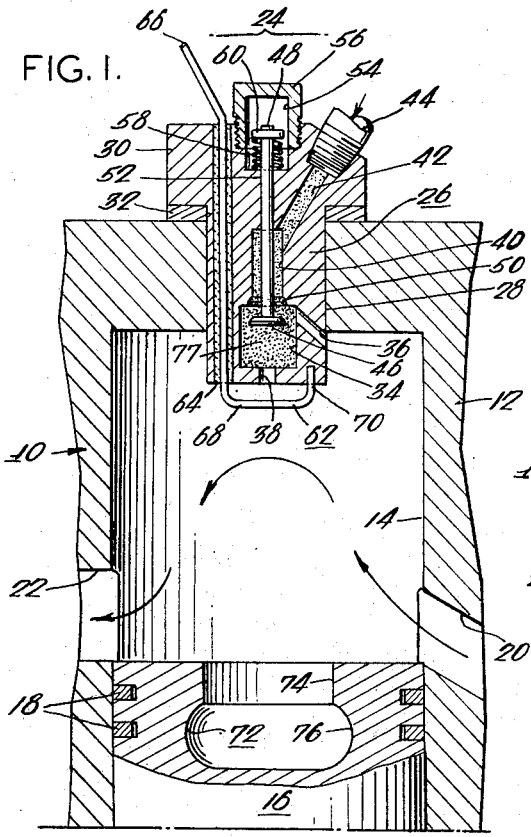

3,402,704
GASEOUS FUEL ENGINE
Julius E. Witzky and John M. Clark, Jr., San Antonio, Tex., assignors, by mesne assignments, to American Gas Association, Inc., New York, N.Y., a corporation of New York
Filed Nov. 29, 1966, Ser. No. 597,676
5 Claims. (Cl. 123—32)

ABSTRACT OF THE DISCLOSURE

An internal combustion engine with a main combustion chamber in the cylinder, and a closed auxiliary combustion chamber with a throat connecting therewith has a separate fuel receiver located in the main combustion chamber.

Piston movement toward top dead center causes movement of the receiver into the throat of the auxiliary combustion chamber to thereby throttle the flow of air from the main into the auxiliary near the end of the compression stroke to create a pressure differential therebetween. A charge of fuel placed in the fuel receiver prior to compression is caused to discharge into the auxiliary combustion chamber passed an igniter by this pressure differential which acts through suitably located ports in the fuel receiver. Combustion is initiated in the auxiliary chamber near top dead center which causes a reverse of the first pressure differential and consequently a reverse flow in the receiver so that any remaining fuel is forced into the main combustion chamber and burned.

---

The present invention relates generally to internal combustion engines and relates more particularly to a novel gaseous fuel internal combustion engine which requires no fuel pumping or injection system nor an ignition timing system.

The present engine is of the type characterized by an auxiliary combustion chamber in the piston which cooperates with a downwardly projecting housing defining a fuel chamber to provide what is known as a "squish" effect whereby fuel is displaced by differential air pressures from the fuel chamber into the auxiliary combustion chamber and the main combustion chamber. This type of engine is shown for example in U.S. Patent 2,692,586 in the setting of a liquid fueled compression ignition engine. The basic concept of this "squish" effect is the development of a pressure differential between the main combustion chamber and the auxiliary combustion chamber to create a movement of air and a displacement of fuel into the auxiliary chamber wherein an initial fuel combustion take place, the combustion pressure being utilized to displace the remaining fuel from the fuel chamber into the main combustion chamber wherein the fuel combustion is completed.

In the above cited Patent 2,692,586, the liquid fuel is drawn through ports communicating with the fuel chamber by the air velocity across the ports created by the pressure differential between the combustion chambers. While this system of fuel displacement is satisfactory for a liquid fuel, it cannot be effectively used with a gaseous fuel. A further complication with a gaseous fuel is the criticality of the air fuel mixture for combustion and the present invention further provides a novel arrangement for initiating combustion in the auxiliary combustion chamber.

In view of the above, it can be understood to be a first object of the present invention to provide an internal combustion engine adapted for operation with gaseous fuels which requires no fuel carburation, fuel pumping, or ignition timing devices.

A further object of the invention is to provide a gaseous fuel engine as described wherein a high pressurization of the gaseous fuel is unnecessary and wherein the fuel is admitted to the engine cylinder by a simple gas pressure-actuated check valve.

Another object of the invention is to provide a gas engine as described having excellent combustion efficiency characteristics and which may be readily controlled by simple mechanical control arrangements.

Still another object of the invention is to provide a gas engine as described having a simplified, light-weight design which may be economically manufactured and maintained.

A still further object of the invention is to provide a gas engine as described which is particularly suited for constant speed operation due to its inherent self-governing characteristics.

Additional objects and advantages of the invention will be more readily apparent from the following detailed description of an embodiment thereof when taken together with the accompanying drawings in which:

FIG. 1 is a sectional elevational view taken through a cylidner of a two-cycle internal combustion engine embodying the present invention showing the piston at its bottom dead center position;

FIG. 2 is a sectional view similar to FIG. 1 showing the piston during the compression stroke just after scavenging air cutoff;

FIG. 3 is a view similar to the views of FIGS. 1 and 2 showing the piston at a further stage in the compression stroke just before ignition of the fuel in the auxiliary combustion chamber.

FIG. 4 is a sectional view taken along lines 4—4 of FIG. 3;

FIG. 5 is a view similar to the views of FIGS. 1–3 showing the piston at top dead center at the start of the downward power stroke; and FIG. 6 is a sectional view taken along lines 6—6 of FIG. 5 showing the plurality of ports radiating from the gas chamber.

Referring to the drawings, the cylinder portion of an engine 10 embodying the present invention is illustrated and includes a cylinder block 12 defining a cylinder 14. A piston 16 having piston rings 18 is mounted for reciprocation within said cylinder, being connected at the lower end thereof by a connecting rod to a crankshaft in the conventional manner. The engine is a two-cycle crankcase-scavenged engine and includes an air inlet port 20 in the cylinder wall connecting with a source of air under pressure, and an exhaust port 22 opposed from the port 20 for exhausting the products of combustion into a suitable exhaust manifold. When the piston 16 drops below the inlet and exhaust ports, a flow of air enters through the inlet port 20 and by virtue of the upwardly directed angle of the port forms a loop of scavenging air and exhausts the products of combustion through the exhaust port 22, as schematically indicated by the flow arrows of FIG. 1.

Mounted on the top of the cylinder block and extending coaxially into the cylinder 14 is the fuel inlet and ignition assembly 24 which includes a stepped housing 26 extending through a suitable opening 28 in the top of of the cylinder block. An outer shoulder portion 30 of the housing 26 is seated on a sealing ring 32 on the block to prevent leakage from the cylinder. The housing 26 is securely fastened to the cylinder block by bolts or other suitable means.

A cylindrical gas chamber 34 is coaxially located in the lower end of the housing 26 and is provided with a plurality of downwardly sloping radial ports 36 as shown in FIG. 6 which open into the upper end of cylinder 14. The gas chamber 34 also communicates with the cylinder 14, at least in the lowered position of the piston 16, by means of a port 38 in the lower end thereof coaxial with the chamber 34 and the cylinder 14. Gaseous fuel is introduced into the gas chamber 34 from a smaller coaxial chamber 40 thereabove which is in turn connected with the diagonal fuel passage 42 and the fuel conduit 44 threadedly connected to the housing 26 at the end thereof. The fuel conduit 44 leads to a source of gaseous fuel under a low pressure, for example, 5 lbs. per square inch.

Flow of gaseous fuel into the gas chamber 34 is controlled by a valve 46 on valve 48 coacting with valve seat 50 at the lower end of the chamber 40. The valve shaft 48 is slidable in the bore 52 of the housing 26 and extends into a spring chamber 54 formed in part by a hollow threaded cover 56 threadedly mounted on the end of the housing. A spring 58 in the spring chamber bearing on a stop 60 on the end of the valve shaft 48 urges the valve 46 toward the valve seat 50.

A glow wire 62 extends vertically through the housing 26 within an insulating sleeve 64, the outer end 66 of the glow wire being connected with a suitable external source of energization which is normally required only during starting of the engine. The lower end 68 of the glow wire extends in a flat loop beneath the housing 26, being aligned beneath the port 38 as shown in FIGS. 4 and 6. The end 70 of the glow wire is fastened in the lower end of the housing to permit the flow of a current through the wire during starting of the engine.

The piston 16 includes a coaxial auxiliary combustion chamber 72 in the upper end thereof adapted to receive the portion of the housing 26 extending into the cylinder 14. The auxiliary combustion chamber includes an upper cylindrical walled portion 74 and a lower undercut portion 76 having smoothly rounded walls. The auxiliary combustion chamber is arranged so that with the piston in the top dead center position shown in FIG. 5, the bottom edge of the housing 26 is even with the upper edge of the lower portion 76 of the combustion chamber, the cylindrical walled upper portion 74 lying in closely spaced relation to the housing.

For operation of the engine, the fuel conduit 44 is connected to a source of gaseous fuel under low pressure and the air inlet port 20 is connected with a source of air under pressure. During operation of the engine, when the piston reaches the bottom dead center position shown in FIG. 1, a flow of scavenging air enters the cylinder through the air inlet port 20 and due to the upwardly directed angle of the port, forms a loop of scavenging air within the cylinder which exhausts the products of combustion through the exhaust port 22 as indicated by the flow arrows. At this point, the pressure in the cylinder is essentially atmospheric and the valve 46 is accordingly opened by the low pressure gaseous fuel in the chamber 40 permitting fuel to fill the gas chamber 34 as shown at 77. The flow of gaseous fuel into the gas chamber forces air and residual exhaust products from the chamber into the cylinder through the ports 36 and 38.

The piston moves upwardly on the compression stroke, closing the air intake and exhaust ports 20 and 22 as shown in FIG. 2 and compressing the air in the cylinder. This causes a compression of the gas in the gas chamber and a resultant closing of the valve 46. The ports 36 and 38 are properly sized so that the valve 46 remains open for the exact period necessary to fill the gas chamber with gaseous fuel.

When the piston has moved up to the position shown in FIG. 3 in which the auxiliary combustion chamber 72 begins to receive the lower end of the housing 26, due to the differentially decreasing volumes of the main combustion chamber 78 formed by the upper surface of the piston and the cylinder, and the auxiliary combustion chamber 72, the air within the main combustion chamber is compressed more rapidly than the air within the auxiliary combustion chamber. In view of the relatively close fit between the cylindrical portion 74 of the auxiliary combustion chamber and the housing 26, air passes from the main combustion chamber through the ports 36 into the gas chamber 34, thereby forcing gaseous fuel out of the gas chamber through the axial port 38 in the lower end thereof.

As shown in FIGS. 3 and 4, which depict the gaseous fuel formation just prior to ignition, a cloud of gaseous fuel 80 is forced from the gas chamber through port 38 by this differential pressure "squish" effect, the cloud enveloping a portion of the loop 68 of the glow wire. When the gaseous fuel/air mixture impinges upon the glow wire, ignition takes place within the auxiliary combustion chamber, thus raising the pressure in the chamber above that of the pressures in the gas chamber and main combustion chamber. This causes high temperature gas and/or burning gas back through the port 38 into the gas chamber, forcing the remaining gas into the main combustion chamber and igniting the air/gas mixture in both the gas chamber and main combustion chamber as shown in FIG. 5. The piston is driven downwardly from the top dead center position in FIG. 5 during completion of the combustion of the gaseous fuel. Toward the end of the expansion stroke, the downwardly moving piston first opens the exhaust port 22 and then the air inlet port 20 to permit scavenging of the cylinder. Upon reaching the bottom dead center position shown in FIG. 1, the cycle is repeated as charging of the gas chamber is again begun.

The quantity of gaseous fuel supplied to the gas chamber depends upon the pressure of the fuel entering the assembly from the fuel conduit 44. By providing a suitable regulating valve for raising or lowering the gas supply pressure to the engine, the speed and load of the engine can be accurately controlled.

The timing of the engine is dependent upon the moment of entrance of the housing 26 into the auxiliary combustion chamber. By designing the engine so that the housing enters the auxiliary combustion chamber at an earlier or later crank angle position, the timing of the fuel ignition can be advanced or retarded to provide the optimum timing. Although the fuel inlet and ignition assembly 24 in the illustrated embodiment is permanently positioned on the cylinder block, it would be possible to provide a timing adjustment of the engine by making the assembly vertically adjustable.

The present gaseous fuel engine is particularly well suited for constant speed applications due to its inherent self-governing operation. Should the engine speed up under reduced load, a reduced time is available to fill the gas chamber, resulting in a reduced fuel input and hence a reduction in speed.

Should the engine slow down under increased load, more time becomes available for filling the gas chamber and the engine speed will increase as a result of a increased fuel input.

The glow wire normally requires energization from an external source only during the starting of the engine. After a short period of engine operation, the residual heat in the wire resulting from the combustion process will normally maintain the wire at a sufficiently high temperature to ignite the fuel charge.

From the above description it can be understood that the present invention provides an extremely simplified engine for operation with gaseous fuels which requires neither fuel carburetion, fuel pumping nor ignition timing devices. The engine is extremely inexpensive to fabricate and, in view of the few parts subject to deterioration, should have a long life with a minimum amount of maintenance. If manufactured in quantity, the fuel inlet and ignition assembly can be produced at a sufficiently low price so that the entire unit can be quickly replaced should any difficulties arise.

Manifestly, changes in details of construction can be effected by those skilled in the art without departing from the spirit and the scope of the invention as defined in and limited solely by the appended claims.

We claim:
1. A gaseous fuel internal combustion engine comprising a cylinder and a piston reciprocable within said cylinder defining a main combustion chamber, scavenging means in said cylinder for charging said combustion chamber with air and discharging products of combustion therefrom, a fuel inlet and ignition assembly extending into said main combustion chamber, an auxiliary combustion chamber in said piston communicating with said main combustion chamber and adapted to receive the inwardly extending end of said fuel inlet and ignition assembly in close-fitting relation, a gas chamber within said assembly, conduit means for connecting said gas chamber with a source of gaseous fuel under low pressure, valve means for controlling the flow of gaseous fuel from said conduit means into said gas chamber, port means connecting said gas chamber with said main combustion chamber, a port in the end of said assembly connecting said gas chamber with said auxiliary combustion chamber when the end of said assembly is received within said auxiliary combustion chamber, and a glow wire extending from the end of said assembly in the vicinity of said latter port, said main and auxiliary combuston chamber having a differential rate of compression whereby the air pressure increases more rapidly in said main combustion chamber during the compession stroke of said piston than in said auxiliary combustion chamber thereby forcing gaseous fuel from said gas chamber through said latter port into said auxiliary combustion chamber wherein combustion is initiated by said glow wire, combustion within said auxiliary combustion chamber forcing gaseous fuel from said gas chamber into said main combustion chamber wherein combustion of the fuel is completed.

2. An internal combustion engine as claimed in claim 1 wherein said glow wire is connected with a source of external energization to heat said wire during starting of said engine.

3. An internal combustion engine as claimed in claim 1 wherein said valve means comprises a spring-loaded valve adapted for opening by the pressure of said gaseous fuel during scavenging of the cylinder.

4. A gaseous fuel internal combustion engine comprising a cylinder and a piston reciprocal within said cylinder defining a main combustion chamber, scavenging means in said cylinder for charging said combustion chamber with air and discharging products of combustion therefrom, a fuel inlet and ignition assembly extending coaxially into said main combustion chamber through the closed end of said cylinder, an auxiliary combustion chamber in said piston communicating with said main combustion chamber and being aligned with and adapted to receive the inwardly extending end of said fuel inlet and ignition assembly in close-fitting relation, a gas chamber within said assembly, conduit means for connecting said gas chamber with a source of gaseous fuel under low pressure, a spring-loaded valve for controlling the flow of gaseous fuel from said conduit means into said gas chamber, said spring-loaded valve being adapted to be opened by the pressure of said gaseous fuel during scavenging of said cylinder, port means connecting said gas chamber with said main combustion chamber regardless of the position of said piston, a port in the end of said assembly connecting said gas chamber with said auxiliary combustion chamber when the end of said assembly is received within said auxiliary combustion chamber, and a glow wire extending from the end of said assembly across the axis of said latter port, said main and auxiliary combustion chambers having a differential rate of compression whereby the air pressure increases more rapidly in said main combustion chamber during the compression stroke of said piston than in said auxiliary combustion chamber thereby forcing gaseous fuel from said gas chamber through said latter port into said auxiliary combustion chamber wherein combustion is initiated by said glow wire, combustion within said auxiliary combustion chamber forcing gaseous fuel from said gas chamber into said main combustion chamber wherein combustion of the fuel is completed.

5. An internal combustion engine as claimed in claim 4 wherein said glow wire is connected with a source of external energization to heat said wire during starting of said engine.

References Cited
UNITED STATES PATENTS

| | | | |
|---|---|---|---|
| 887,393 | 5/1908 | Haselwander | 123—33 |
| 2,465,116 | 3/1949 | Petersen | 123—143 |
| 2,488,857 | 11/1949 | Firing | 123—33 |
| 2,692,586 | 10/1954 | Kaniut et al. | 123—32 |
| 2,723,653 | 11/1955 | Blake et al. | 123—120 |

LAURENCE M. GOODRIDGE, *Primary Examiner.*